(12) United States Patent
Mori

(10) Patent No.: US 8,244,688 B2
(45) Date of Patent: Aug. 14, 2012

(54) MANAGING APPARATUS, RECORDING MEDIUM IN WHICH MANAGING PROGRAM IS RECORDED, AND EXPIRATION DATE DETERMINING METHOD

(75) Inventor: Takafumi Mori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 227 days.

(21) Appl. No.: 12/730,605

(22) Filed: Mar. 24, 2010

(65) Prior Publication Data

US 2010/0293152 A1 Nov. 18, 2010

(30) Foreign Application Priority Data

May 13, 2009 (JP) ................................. 2009-116984

(51) Int. Cl.
*G06F 17/30* (2006.01)
(52) U.S. Cl. ........................................ 707/689; 707/797
(58) Field of Classification Search .................. 707/689, 707/758, 797, 695; 713/194, 177; 726/26
See application file for complete search history.

(56) References Cited

U.S. PATENT DOCUMENTS

| | | | | |
|---|---|---|---|---|
| 6,105,053 A | * | 8/2000 | Kimmel et al. | 718/105 |
| 6,226,743 B1 | * | 5/2001 | Naor et al. | 713/177 |
| 2007/0283043 A1 | | 12/2007 | Kiyohara et al. | |
| 2008/0147821 A1 | * | 6/2008 | Dietrich et al. | 709/216 |
| 2009/0037445 A1 | | 2/2009 | Ushiyama | |
| 2011/0060922 A1 | * | 3/2011 | Sasaki et al. | 713/194 |

FOREIGN PATENT DOCUMENTS

| | | |
|---|---|---|
| JP | A-2006-197400 | 7/2006 |
| JP | A-2007-053662 | 3/2007 |
| JP | A-2007-280303 | 10/2007 |

* cited by examiner

*Primary Examiner* — Hung T Vy
(74) *Attorney, Agent, or Firm* — Oliff & Berridge, PLC

(57) ABSTRACT

An apparatus includes: a storage unit storing page information located at a root, a node, and a leaf in a tree structure, and storing the plurality of page information including an expiration date of a record that is included in any page information; a search unit searching a record that has passed its expiration date; a determination unit determining whether or not the expiration date included in the page information has come; a first control unit configured to make the determination unit determine whether the expiration date included in predetermined page information stored as the tree structure has come; and a second control unit configured to make the search unit end the search of the record that has passed its expiration date, and configured to make the determination unit determine whether the expiration date included in page information located at a child of the predetermined page information has come.

12 Claims, 15 Drawing Sheets

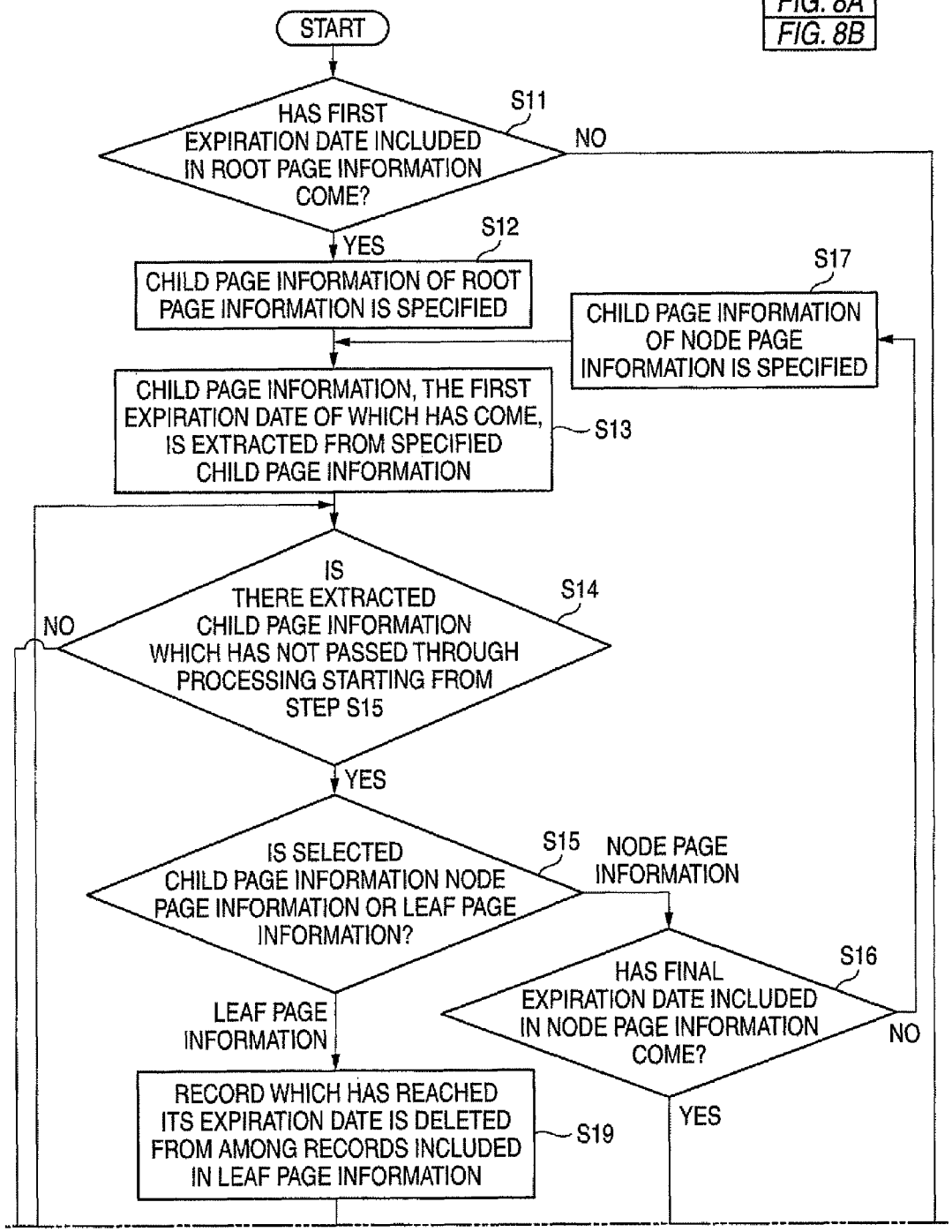

ion, the content catalog information is created by the content managing server etc., and is distributed to each node apparatus. Moreover, in the related art content distributed storage system, when new content data is added or when the use of content data ends, the content catalog information is updated by the content managing server and is then distributed to each node apparatus.

MANAGING APPARATUS, RECORDING MEDIUM IN WHICH MANAGING PROGRAM IS RECORDED, AND EXPIRATION DATE DETERMINING METHOD

CROSS REFERENCE TO RELATED APPLICATION

The present application claims priority from Japanese Patent Application No. 2009-116984, which was filed on May 13, 2009, the disclosure of which is herein incorporated by reference in its entirety.

TECHNICAL FIELD

Apparatuses, devices and methods consistent with the present invention relate to a content distributed storage system in which a plurality of content data is distributed and stored in a plurality of node apparatuses which can communicate with each other through a network.

BACKGROUND

In a related art content distributed storage system, each node apparatus can search desired content data by using the content catalog information, in which the attribute information of the content data is described, and acquire it from other node apparatuses or a content managing server. Information including a content name, publication start date and time, publication end date and time, and a search keyword of the content data is included in the attribute information. In addition, the content catalog information is created by the content managing server etc., and is distributed to each node apparatus. Moreover, in the related art content distributed storage system, when new content data is added or when the use of content data ends, the content catalog information is updated by the content managing server and is then distributed to each node apparatus.

SUMMARY

In order to reduce the amount of data of the content catalog information stored in one node apparatus, a related art apparatus is proposed in which the content catalog information divided into a plurality of information items is distributed and stored in a plurality of node apparatuses. In this case, when the publication end date and time has come, the content data that has passed its expiration date is processed so that it is not possible to access the content data on a program. However, if a record of the attribute information of such content data that has passed its expiration date is left in the content catalog information, the amount of data of the content catalog information increases. Therefore, it is necessary to delete the record of the attribute information of the content data that has passed its expiration date periodically from the content catalog information.

In the case of content catalog information in the related art, however, it is necessary to check all records in the content catalog information every time in order to delete from the content catalog information a record of the attribute information of the content data which has reached its expiration date, and this was not efficient. Even if it could be seen that the expiration date had come, it was not possible to check which content had reached its expiration date if all of the records were not checked.

The invention has been made in view of the above problems. It is an object of the invention to provide a managing apparatus, a recording medium in which managing program is stored, a node apparatus, a recording medium in which a node processing program is stored, and a method of determining a record that has passed its expiration date which are capable of efficiently determining whether or not there is a record, which has reached its expiration date, even if records of all attribute information items managed are not checked and which are capable of quickly searching for a record that has passed its expiration date. Moreover, it is another object of the invention to provide a managing apparatus, a recording medium in which a managing program is recorded, and an expiration date determining method capable of preventing useless searches when searching for a record.

According to an illustrative aspect of the present invention, there is provided a managing apparatus comprising: a storage unit that stores page information located at a root, a node, and a leaf in a tree structure, the storage unit storing the plurality of page information including an expiration date of a record that is included in any page information which is located at the root, at the node or at the leaf in the tree structure; a search unit that searches a record that has passed its expiration date; a determination unit that determines whether or not the expiration date included in the page information has come when the search unit searches the record that has passed its expiration date; a first control unit that is configured to make the determination unit determine whether or not the expiration date included in predetermined page information stored as the tree structure has come when the search unit searches the record that has passed its expiration date; and a second control unit that is configured to make the search unit end the search of the record that has passed its expiration date when the determination unit is made to determine, by the first control unit, that the expiration date included in the predetermined page information has not come yet, and configured to make the determination unit determine whether or not the expiration date included in page information located at a child of the predetermined page information has come when the determination unit is made to determine, by the first control unit, that the expiration date included in the predetermined page information has come.

According to the above illustrative aspect of the present invention, even if all records which are managed are not checked, it is possible to efficiently determine whether or not there is a record that has reached its expiration date. In addition, it is possible to quickly search for a record which has reached its expiration date. In addition, useless searches can be prevented when searching for a record.

BRIEF DESCRIPTION OF THE DRAWINGS

Illustrative aspects of the invention will be described in detail with reference to the following figures wherein:

FIG. 8A and FIG. 8B are flow charts showing an example of the process of searching for a record, which has passed its expiration date, in the control unit 11 of the content managing server MS;

DETAILED DESCRIPTION OF EXEMPLARY EMBODIMENTS OF THE PRESENT INVENTION

Figure 1:
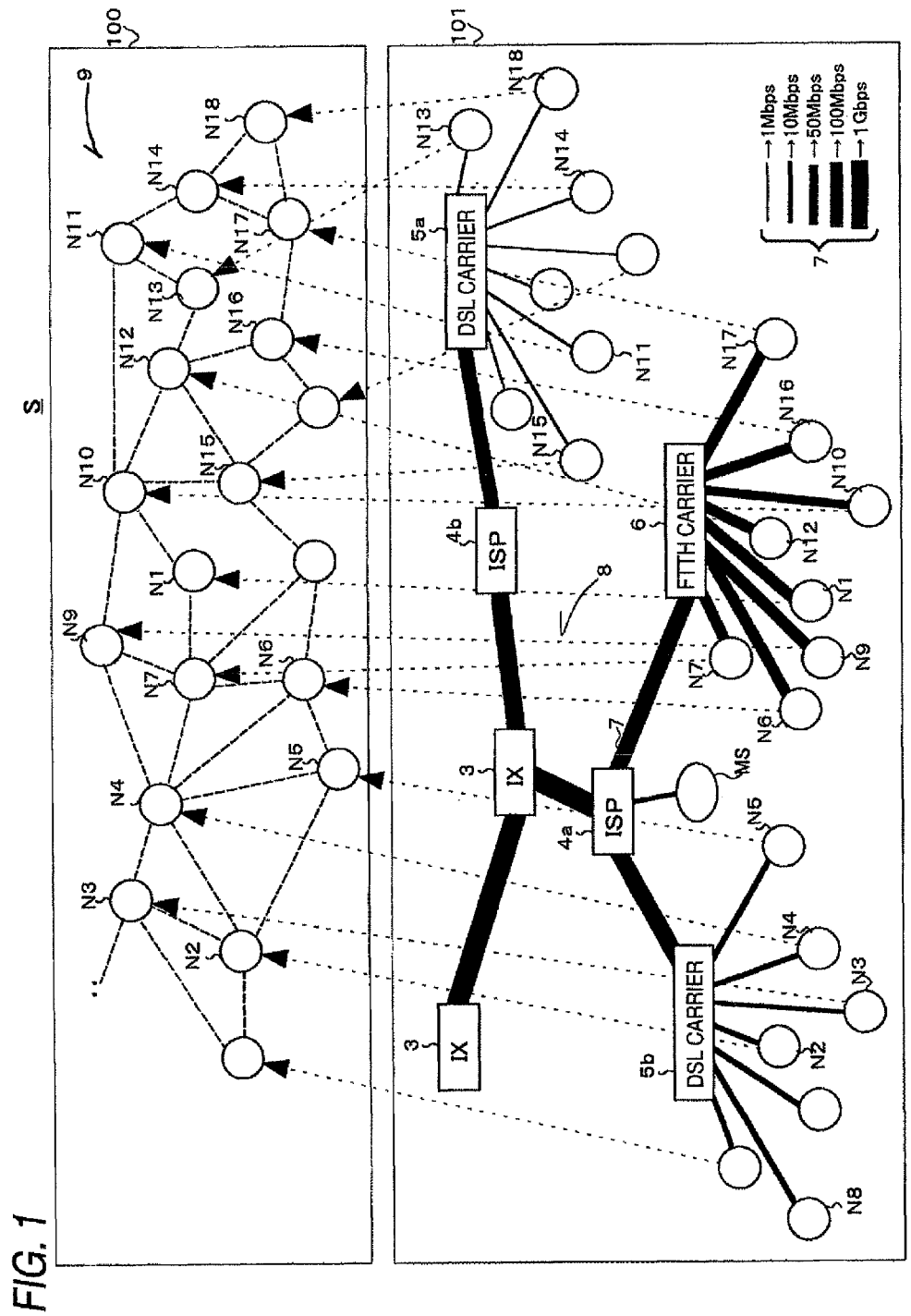
FIG. 1 is a view showing an example of a connection state of node apparatuses in a content distributed storage system according to the exemplary embodiment.

Hereinafter, exemplary embodiments of the present invention will be described with reference to the accompanying drawings. In addition, an embodiment described below is an embodiment when the invention is applied to a content distributed storage system.

[1. Outline of Configuration and Operation of a Content Distributed Storage System]

First, the outline of the configuration and operation of a content distributed storage system according to the present embodiment will be described with reference to FIG. 1. As shown in a lower frame 101 of FIG. 1, a distributed storage system S is configured to include a plurality of node apparatuses Nn connected through the Internet. Moreover, as shown in the lower frame 101 of FIG. 1, a network 8, such as the Internet, is built by an IX (Internet eXchange) 3, ISPs (Internet Service Providers) 4a and 4b, apparatuses 5a and 5b of DSL (Digital Subscriber Line) carriers, an apparatus 6 of an FTTH (Fiber To The Home) carrier, a communication line 7, and the like. In addition, for example, a telephone line or an optical cable is used as the communication line 7.

A plurality of node apparatuses Nn (n=1, 2, 3, . . . ) are connected to the network 8. In the following explanation, a node apparatus is called a "node". In addition, unique serial number and IP (Internet Protocol) address are assigned to each node Nn. Moreover, the content distributed storage system S according to the present embodiment is a peer-to-peer type network system formed by connections of a plurality of nodes Nn among the nodes Nn as shown in an upper frame 100 of FIG. 1.

In addition, a network 9 shown in the upper frame 100 of FIG. 1 is an overlay network 9 which forms a virtual link formed using the existing network 8. The overlay network 9 is realized by specific algorithm, for example, algorithm using a DHT. In addition, a node ID which is unique identification data involving predetermined digits is assigned to each node Nn connected to the content distributed storage system S. In addition, the node ID is a value obtained by hashing an IP address or serial number individually assigned to each node Nn using a common hash function, for example. Node IDs are disposed in the ID space so as to be distributed without being biased. In the present embodiment, SHA-1 is used as a hash function. In addition, the hashed value is set to have a bit length of 160 bits, for example.

In addition, each node Nn holds a routing table using a DHT. The routing table using a DHT specifies the transmission destinations of various messages on the content distributed storage system S. Specifically, a plurality of node information items including node IDs, IP addresses, and port numbers of the nodes Nn which are appropriately separated from each other in the ID space are registered in the routing table. In addition, such a routing table using a DHT is known in JP-A-2006-197400, and accordingly, the detailed explanation will be omitted.

Moreover, in the content distributed storage system S, various content data with different content are distributed and stored on the plurality of nodes Nn in a predetermined file format. The content data is data of a film, music, and the like, for example. Moreover, in the following explanation, the content data is called "content".

In addition, the information, such as a content name and a content ID, is given to each of the content. In addition, the content ID is unique identification data for each item of content. For example, the content ID is created by hashing "content name+arbitrary value" using a common hash function when acquiring the node ID. Moreover, the content ID may also be created by hashing several bytes of the head of the content using a common hash function when acquiring the node ID. Alternatively, the system administrator may give a unique ID value for each item of content. The ID value has the same bit length as the node ID.

The locations of the content which are distributed and stored as described above are managed by a node Nn which manages the locations. In addition, in the following explanation, the node Nn which manages the locations is called a "root node". Moreover, a node Nn which stores the content is called a "content hold node".

The root node stores the node information on a content hold node and the location information including a set of content ID and the like of the content. Thus, the location of a content hold node is managed. The root node is set to be a node Nn with a node ID closet to the content ID, for example. The "node ID closet to the content ID" means a node ID with many high order digits which match those of the content ID, for example.

In addition, when a user of a certain node Nn wants to acquire the desired content, the node Nn creates a content location inquiry message. The content location inquiry message is a kind of search query. In addition, in the following explanation, the node Nn which creates a content location inquiry message according to the instruction from a user is called a "user node".

The content location inquiry message includes a content ID of content select by the user, an IP address of a user node which created the content location inquiry message, and the like. Then, the content location inquiry message is transmitted to other nodes Nn according to a routing table using a DHT stored in the user node. That is, the user node transmits the content location inquiry message to the root node. Accordingly, the content location inquiry message reaches the root node eventually by DHT routing using the content ID as a key. In addition, the DHT routing is known in JP-A-2006-197400, and accordingly, the detailed explanation will be omitted.

When the content location inquiry message is received, the root node acquires the location information corresponding to the content ID included in the content location inquiry message. Then, the root node returns the acquired location information to the user node which is a transmission source of the received content location inquiry message. After acquiring the location information, the user node accesses a content hold node on the basis of the IP address of the content hold node included in the location information. Accordingly, the user node can download the content from the content hold node and reproduce the content. In addition, the root node may transmit a content transmission request message to a content hold node indicated by an IP address or the like included in the location information. In this case, the content hold node accesses a user node to provide the content.

In addition, all content stored in the content distributed storage system S are managed by a content managing server MS. The content managing server MS stores the attribute information of all content stored in the content distributed storage system S. In addition, the content managing server MS distributes the content catalog information including the attribute information of content to all the nodes Nn by DHT multicast. In the DHT multicast, a message distributed from the content managing server MS to a certain node Nn is sequentially transmitted to the nodes Nn, which are connected to the content distributed storage system S, according to the routing table using a DHT. Eventually, the message is transmitted to all nodes Nn. In addition, since the DHT multicast is known in JP-A-2007-053662, for example, a detailed explanation thereof will be omitted.

[2. Data Structure and Content of Content Catalog Information]

Figure 2:
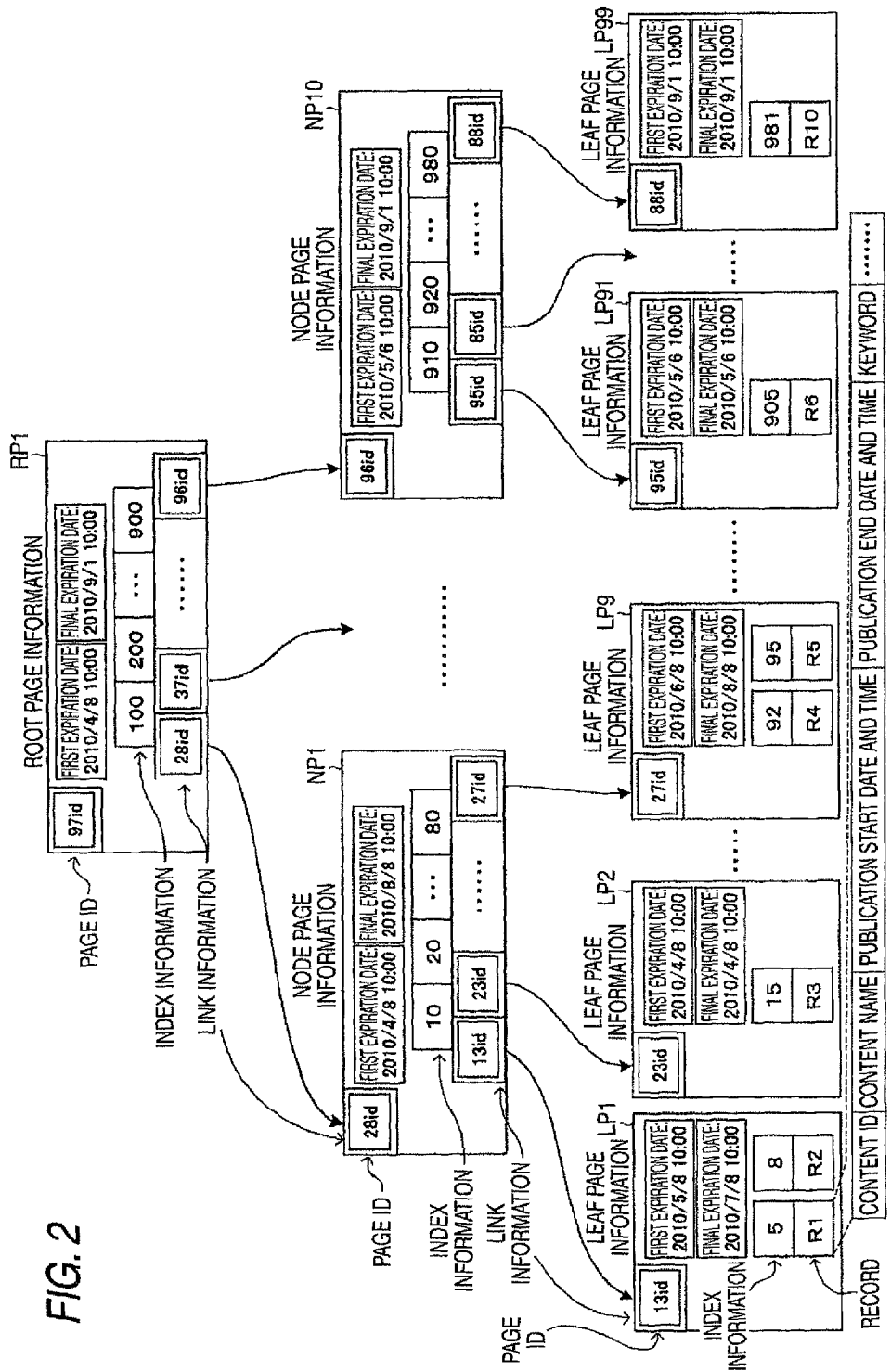
FIG. 2 is a view showing an example of the data structure of content catalog information in the exemplary embodiment.

Next, data structure and content of the content catalog information will be described with reference to FIG. 2. The content catalog information used in the exemplary embodiment has a structure of a search tree shown in FIG. 2 in order to search a record of the attribute information of content efficiently. More specifically, the content catalog information includes the page information located at a root, nodes, and leaves in a tree structure, as shown in FIG. 2. In addition, page information items from the page information located at the root of a high order hierarchy to the page information located at the leaves of a low order hierarchy are associated with each other. Moreover, in the following explanation, the page information located at the root is called "root page information". In addition, the page information located at a node is called "node page information". In addition, the page information located at a leaf is called "leaf page information". In addition, the record of the attribute information of content is called a "record".

In addition, the page information items which are directly associated show parent-child relationship. For example, of two page information items directly associated with each other, the page information on the high order hierarchy side is parent's page information and the page information on the low order hierarchy side is child's page information. Moreover, in the following explanation, the page information of the parent's location is called "parent page information". In addition, the page information of the child's location is called "child page information".

In addition, a record is included in any page information from the location of the page information to leaf page information in a tree structure. Here, the location of the page information in a tree structure refers to the root page information. In the example shown in FIG. 2, two records R1 and R2 are included in leaf page information LP1. In addition, one record R3 is included in leaf page information LP2. In addition, in the present embodiment, the maximum number of records included in one page information is set beforehand to a predetermined number (for example, two). In addition, the attribute information of one content is stored in one record. In addition, although an example where a record is included only in each leaf page information item is shown in FIG. 2, the record may also be included in the root page information or the node page information.

Here, information including a content ID, a content name, publication start date and time, publication end date and time, and a keyword is included in the attribute information of content. The keyword is used when a user searches a content ID of desired content from the content catalog information. For example, the keyword is a genre of content. When the user inputs a desired keyword, a content ID of the desired content is searched from the content catalog information. In addition, the publication end date and time is an expiration date of the content data. In other words, the publication end date and time is an expiration date of the record. When this expiration date comes, the content ID cannot be searched from the content catalog information. Accordingly, when the expiration date comes, the location of content cannot be searched using a content ID in the content distributed storage system S.

In addition, a page ID which is unique in the content catalog information is given to the page information. The page ID may be a serial number or may be a hash value obtained by hashing the page information, to which the page ID has been given, using a hash function. Or the page ID may be a set of serial number and hash value. If the hash value is used, falsification check of the page information can be performed.

In addition, link information and index information are included in the page information. The link information is information indicating the relationship between the parent page information and the child page information. In the example shown in FIG. 2, page IDs of node page information NP1 to NP10 are included in the root page information RP1 as link information. Accordingly, the node page information NP1 to NP10 is associated as child page information of the root page information RP1. In addition, page IDs of leaf page information LP1 to LP9 are included in the node page information NP1 as link information. Accordingly, the leaf page information LP1 to LP9 is associated as child page information of the node page information NP1. In addition, the maximum number of link information items which can be stored in one root page information item or one node page information item matches the order as a tree structure of the content catalog information, for example. This order is equivalent to the value of n in the "n" search tree. In addition, although the content catalog information is configured to include three hierarchy levels in the example shown in FIG. 2, the number of hierarchy levels changes with the number of records or the value of n in the "n" search tree.

In addition, the index information is information for searching certain page information in root page information to leaf page information or information for searching for a record included in any page information from the root page information to the leaf page information. The tree structure of the content catalog information has the order. Therefore, index information items included in the root page information and the node page information are arrayed in order of small value.

For example, in FIG. 2, the index information included in the root page information RP1 is the values of 100, 200, . . . , and 900. In addition, the index information included in the node page information NP1 is the values of 10, 20, . . . , and 80. In addition, although the index information shown in FIG. 2 is expressed in decimals for convenience, it is not limited to this.

In addition, the link information items are arrayed in order corresponding to the index information. In the example shown in FIG. 2, first link information "13id" from the left included in the node page information NP1 indicates the association to the leaf page information LP1 in which the value of the index information equal to or smaller than the value "10" related to the first index information from the left is included. In addition, second link information "23id" from the left included in the node page information NP1 indicates the association to the leaf page information LP2 in which the value of the index information equal to or smaller than the value "20", which is larger than the value "10" related to the first index information from the left and which is related to the second index information from the left, is included. In addition, when "k" link information items are included in certain node page information currently, "k-1" index information items are included in the node page information.

Moreover, as shown in FIG. 2, a record and the index information included in the leaf page information are matched with each other in one-to-one correspondence. Therefore, a corresponding record can be uniquely specified by the index information.

Moreover, the expiration date of a record, which is included in any page information from the root page information to the leaf page information, is included in each page information item. In the example shown in FIG. 2, two kinds of expiration dates of first expiration date and final expiration date are included in each page information item. The first expiration date is an expiration date which comes first among the expiration dates of records included in any page information from the page information including the first expiration date to the leaf page information of low order hierarchy. On the other hand, the final expiration date is an expiration date which comes last among the expiration dates of records included in any page information from the page information including the final expiration date to the leaf page information of low order hierarchy.

For example, in FIG. 2, the expiration date which comes first between the expiration date of the record R1 and the expiration date of the record R2, which are included in the leaf page information LP1, is the first expiration date "2010/5/8 10:00" included in the leaf page information LP1. Moreover, the expiration date which comes last between the expiration date of the record R1 and the expiration date of the record R2, which are included in the leaf page information LP1, is the last expiration date "2010/7/8 10:00" included in the leaf page information LP1. In addition, when only one record is included like the leaf page information LP2, the expiration date of the record is first and final expiration dates included in the leaf page information LP1.

In addition, the first expiration date "2010/4/8 10:00" described in the node page information NP1 is a first expiration date which comes first among first expiration dates included in the leaf page information LP1 to LP9 which is the child page information of the node page information NP1. In addition, the final expiration date "2010/8/8 10:00" described in the node page information NP1 is a final expiration date which comes last among final expiration dates included in the leaf page information LP1 to LP9 which is the child page information of the node page information NP1.

In addition, the first expiration date "2010/4/8 10:00" described in the root page information RP1 is a first expiration date which comes first among first expiration dates included in the node page information NP1 to NP10 which is the child page information of the root page information RP1. In addition, the final expiration date "2010/9/1 10:00" described in the root page information RP1 is a final expiration date which comes last among final expiration dates included in the node page information NP1 to NP10 which is the child page information of the root page information RP1.

In addition, since a record having publication end date and time which is an expiration date is included in the node page information, the first and final expiration dates may not necessarily be included. That is, by performing tracing up to the leaf page information by search, the expiration dates of all records included in the leaf page information may be checked one by one.

Using the content catalog information described above, it is possible to efficiently determine whether or not there is a record which has reached its expiration date even if all records which are managed are not checked.

In addition, although it is most effective that both the first expiration date and the final expiration date are stored in each page information item, the two expiration dates are not necessarily needed simultaneously. For this reason, a configuration is also effective in which either the first expiration date or the final expiration date is stored in each page information item. In addition, when the first expiration date is included, it is possible to determine whether or not there is a record which has reached its expiration date on the basis of the first expiration date even if all records which are managed are not checked. As a result, a record which has reached its expiration date can be searched more quickly.

Moreover, the first expiration date may not necessarily be an expiration date which comes first, and may also be an expiration date which comes for the n-th time (n is an integer of 2 or more) among expiration dates of records included in any page information from certain page information to leaf page information of the low order hierarchy. However, the most effective case is when the first expiration date is an expiration date which comes first.

[3. Configuration and Function of the Content Managing Server MS]

Next, the configuration and function of the content managing server MS will be described with reference to FIG. 3. In addition, the content managing server MS is an example of a managing apparatus of the invention.

Figure 3:
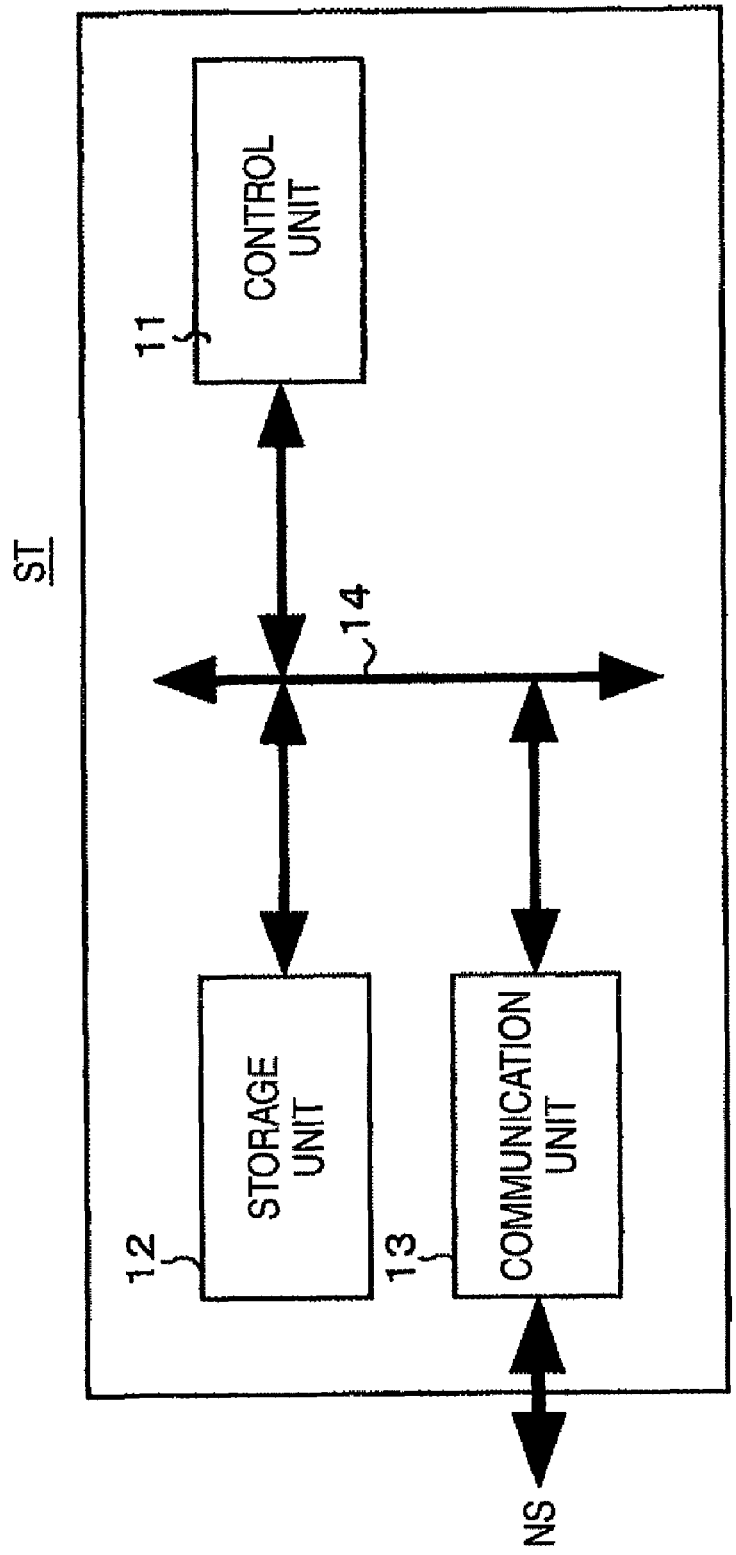
FIG. 3 is a view showing an example of the outline configuration of a content managing server MS.

As shown in FIG. 3, the content managing server MS is configured to include a control unit 11, a storage unit 12, and a communication unit 13. The control unit 11, the storage unit 12 as a storage means and the communication unit 13 are connected to each other through a bus 14.

The control unit 11 includes a CPU with an operation function, a RAM for operations, and a ROM which stores various kinds of data and programs. Moreover, the control unit 11 performs overall control of the content managing server MS by reading and executing a program stored in the storage unit 12 or the like using the CPU.

In addition, more detailed processing executed by the control unit 11 will be described later. In addition, the processing executed by the control unit 11 is realized by executing a managing program of the invention using one or a plurality of CPUs. In addition, the control unit 11 has a clock function so that current date (year, month, and day) and time can be referred to.

The storage unit 12 is formed by a hard disk and the like for storing various data, various programs, and the like. In addition, the managing program of the invention, content files, a routing table using a DHT, and the like are stored in the storage unit 12. In addition, the content catalog information configured to include the page information located at the root, nodes, and leaves in a tree structure is stored in the storage unit 12.

The communication unit 13 performs communication control of the information between the nodes Nn through the network 8.

[4. Configuration and Function of the Node Nn]

The configuration and function of the node Nn will be described with reference to FIG. 4.

Figure 4:
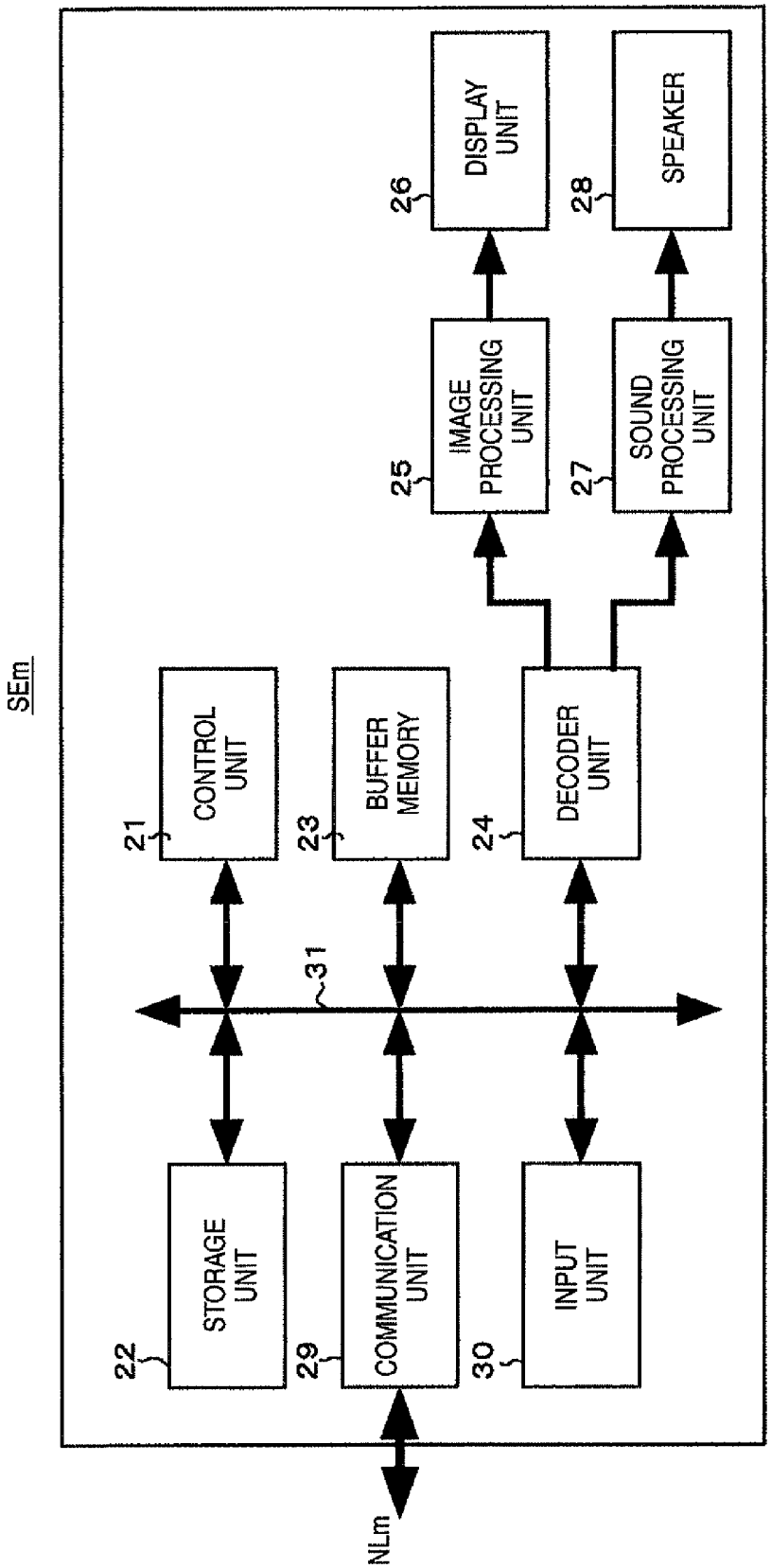
FIG. 4 is a view showing an example of the outline configuration of a node Nn.

FIG. 4 is a view showing an example of the outline of the configuration of the node Nn.

As shown in FIG. 4, each node Nn is configured to include a control unit 21, a storage unit 22 as a storage means, a buffer memory 23, a decoder unit 24, an image processing unit 25, a display unit 26, a sound processing unit 27, a speaker 28, a communication unit 29, an input unit 30, and the like. The control unit 21, the storage unit 22, the buffer memory 23, the decoder unit 24, the communication unit 29, and the input unit 30 are connected to each other through a bus 31.

The control unit 21 includes a CPU with an operation function, a RAM for operations, and a ROM which stores various kinds of data and programs. Moreover, the control unit 21 performs overall control of all nodes Nn by reading and executing a program stored in the storage unit 22 or the like using the CPU. In addition, the control unit 21 has a clock function so that current date (year, month, and day) and time can be referred to:

The storage unit 22 is formed by a hard disk or the like for storing various data, various programs, and the like. A node processing program of the invention, content files, content catalog information, location information, a routing table using a DHT, and the like are stored in the storage unit 22. In addition, the node processing program may be downloaded from a predetermined server on the network 8, for example. In addition, the node processing program may be recorded in a recording medium, such as a CD-ROM, and may be read through the drive of the recording medium, for example.

The buffer memory 23 stores the received content temporarily. The decoder unit 24 decodes the encoded video data, audio data, and the like included in the content. The image processing unit 25 outputs a video signal by performing predetermined drawing processing on the decoded video data. The display unit 26 is a CRT or a liquid crystal display, for example, which displays an image on the basis of the video signal output from the image processing unit 25. The sound processing unit 27 performs D (Digital)/A (analog) conversion of the decoded audio data into an analog audio signal and then amplifies the analog audio signal with an amplifier and outputs it. The speaker 28 outputs the audio signal output from the sound processing unit 27 as a sound wave. The communication unit 29 performs control of information communication with other nodes Nn or the content managing server MS through the network 8. The input unit 30 receives an instruction from a user and transmits an instruction signal corresponding to the instruction to the control unit 21. The input unit 30 is a keyboard, a mouse, or an operation panel, for example.

In addition, a personal computer, an STB (Set Top Box), a TV receiver, or the like may be applied as the node Nn.

In the configuration of the node Nn described above, the control unit 21 performs overall control of the node Nn by reading and executing a program, such as the node processing program of the invention, stored in the storage unit 22 or the like using the CPU. In addition, if the program is executed, the node Nn is connected to the content distributed storage system S and performs processing as at least one node of the user node, the root node, and the content hold node.

In addition, the control unit 21 is realized by executing the node processing program of the invention using one or a plurality of CPUs.

[5. Operation of the Content Distributed Storage System S]
(First Embodiment)

Next, an operation of the content distributed storage system S will be described.

(Operation when Adding a Record)

First, an operation when adding a record will be described with reference to FIGS. 2 and 5 to 7.

Figure 5:
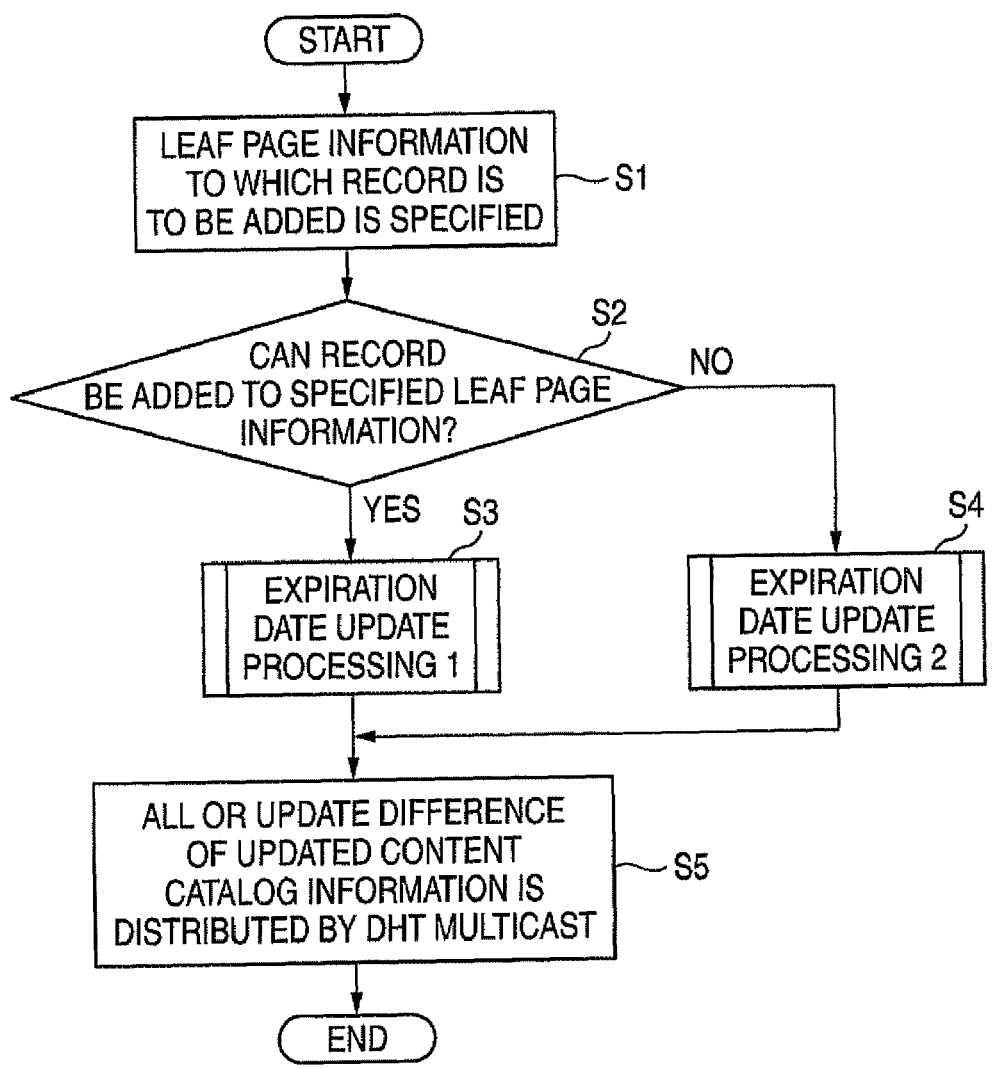
FIG. 5 is a flow chart showing an example of processing when a control unit 11 of the content managing server MS adds a record.

Processing shown in FIG. 5 starts when there is an input of new content. Here, the input of content refers to transmitting new content to the arbitrarily selected node Nn and storing the content, for example. In addition, the above-described attribute information is given to the new content. In addition, a new record has an expiration date and the unique index information is matched with the new record.

When the processing shown in FIG. 5 starts, the control unit 11 acquires a new record through an input unit (not shown), for example. For example, the input unit receives an instruction from an administrator and transmits an instruction signal corresponding to the instruction to the control unit 11. The input unit 14 is a keyboard, a mouse, an operation panel, or a terminal that an operator uses, for example. Then, the control unit 11 specifies the leaf page information, to which this record is to be added, on the basis of the index information matched with the new record (step S1). For example, it is assumed that the value of the index information matched with the new record is "11". In this case, in the example shown in FIG. 2, the node page information NP1 with the index information equal to or smaller than the value "100" of the index information included in the root page information RP1 is specified. Then, the leaf page information LP2 with the index information, which is larger than the value "10" of the index information included in the node page information NP1 and which is equal to or smaller than the value "20", is specified. In addition, the page information to which a record is to be added may be node page information.

Then, the control unit 11 determines whether or not the record can be added to the specified leaf page information (step S2). For example, when it is equal to or smaller than the maximum number of records set beforehand, the control unit 11 determines that the record can be added. When the control unit 11 determines that the record can be added to the specified leaf page information (step S2: YES), the process proceeds to step S3. On the other hand, when the control unit 11 determines that the record cannot be added to the specified leaf page information (step S2: NO), the process proceeds to step S4.

Figures 6, 6A, 6B:
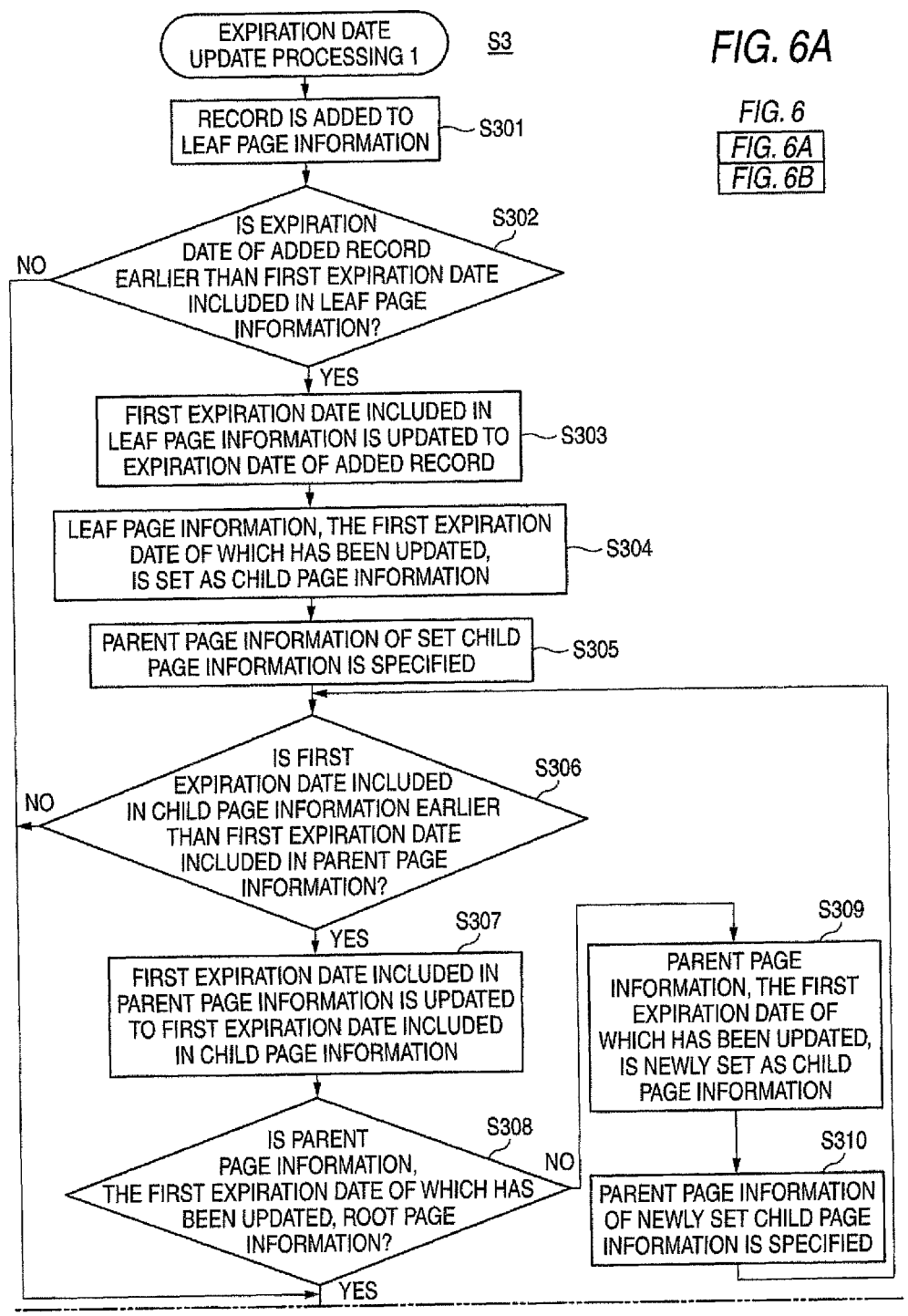
FIGS. 6A and 6B are flow charts showing the details of expiration date update processing 1 in step S3 shown in FIG. 5.
Figure 6B:
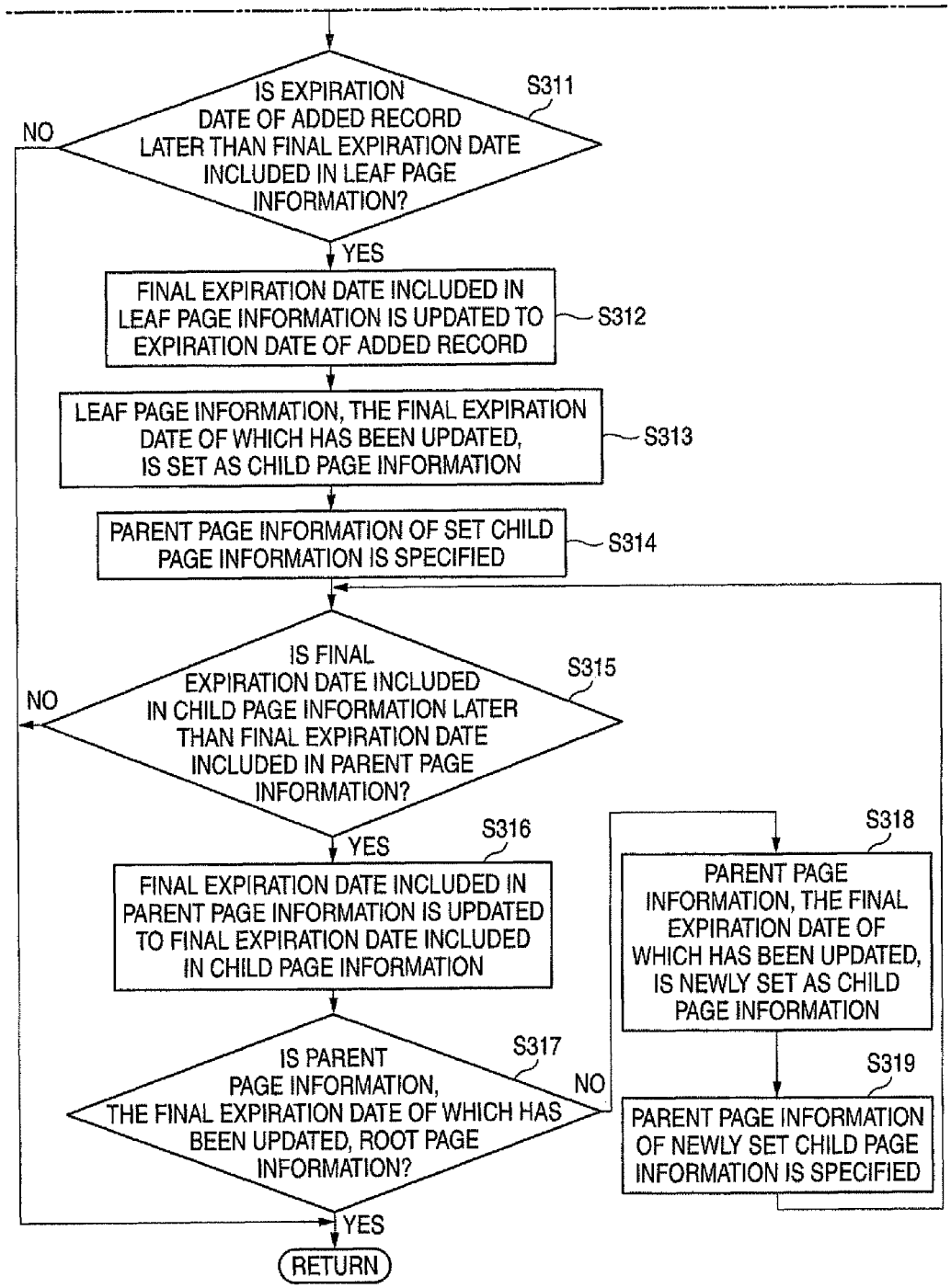

In expiration date update processing 1 in step S3, the control unit 11 adds the record and the index information matched therewith to the leaf page information specified in step S1, as shown in FIG. 6 (step S301).

Then, the control unit 11 determines whether or not the expiration date of the record added to the leaf page information is earlier than the first expiration date included in the leaf page information (step S302). When the control unit 11 determines that the expiration date of the added record is earlier than the first expiration date included in the leaf page information (step S302: YES), the process proceeds to step S303. On the other hand, when the control unit 11 determines that the expiration date of the added record is not earlier than the first expiration date included in the leaf page information (step S302: NO), the process proceeds to step S311.

In step S303, the control unit 11 updates the first expiration date, which is included in the leaf page information to which the record has been added, to the expiration date of the added record.

Then, the control unit 11 sets the leaf page information, the first expiration date of which has been updated, as child page information (step S304).

Then, the control unit 11 specifies the parent page information of the set child page information (step S305). For example, assuming that the child page information is the leaf page information LP1 shown in FIG. 2, the parent page information is the node page information NP1.

Then, the control unit 11 determines whether or not the first expiration date included in the set child page information is earlier than the first expiration date included in the specified parent page information (step S306). That is, the control unit 11 determines whether or not the expiration date of the newly added record is earlier than the first expiration date included in the parent page information of the page information determined in step S302.

When the control unit 11 determines that the first expiration date included in the child page information is earlier than the first expiration date included in the parent page information (step S306: YES), the process proceeds to step S307. On the other hand, when the control unit 11 determines that the first expiration date included in the child page information is not earlier than the first expiration date included in the parent page information (step S306: NO), the process proceeds to step S311.

In step S307, the control unit 11 updates the first expiration date included in the parent page information to the first expiration date included in the child page information. That is, the control unit 11 updates the expiration date included in the parent page information to the expiration date of the newly added record.

Then, the control unit 11 determines whether or not the parent page information, the first expiration date of which has been updated, is root page information (step S308). When the control unit 11 determines that the parent page information is not root page information (step S308: NO), the process proceeds to step S309. On the other hand, when the control unit 11 determines that the parent page information is root page information (step S308: YES), the process proceeds to step S311.

In step S309, the control unit 11 newly sets the parent page information, the first expiration date of which has been updated, as child page information.

Then, the control unit 11 specifies the parent page information of the newly set child page information (step S310) and returns to step S306. In this way, update of the first expiration date is repeatedly performed toward the root page information until it is determined that the first expiration date included in the child page information is not earlier than the first expiration date included in the parent page information in step S306 or it is determined that the parent page information is root page information in step S308. Accordingly, when a new record is added to the leaf page information, the first expiration date included in the page information from the leaf page information, to which the new record is added, to the root page information can be updated efficiently.

Then, in step S311, the control unit 11 determines whether or not the expiration date of the record added to the leaf page information is later than the final expiration date included in the leaf page information. When the control unit 11 determines that the expiration date of the added record is later than the final expiration date included in the leaf page information (step S311: YES), the process proceeds to step S312. On the other hand, when the control unit 11 determines that the expiration date of the added record is not later than the final expiration date included in the leaf page information (step S311: NO), the control unit 11 ends the update of the content catalog information and the process proceeds to step S5 shown in FIG. 5.

In step S312, the control unit 11 updates the final expiration date included in the leaf page information, to which the record has been added, to the expiration date of the added record.

Then, the control unit 11 sets the leaf page information, the final expiration date of which has been updated, as child page information (step S313).

Then, the control unit 11 specifies the parent page information of the set child page information (step S314).

Then, the control unit 11 determines whether or not the final expiration date included in the set child page information is later than the final expiration date included in the specified parent page information (step S315). That is, the control unit 11 determines whether or not the expiration date of the newly added record is later than the final expiration date included in the parent page information of the page information determined in step S311. When the control unit 11 determines that the final expiration date included in the child page information is later than the final expiration date included in the parent page information (step S315: YES), the process proceeds to step S316. On the other hand, when the control unit 11 determines that the final expiration date included in the child page information is not later than the final expiration date included in the parent page information (step S315: NO), the control unit 11 ends the update of the content catalog information and the process proceeds to step S5 shown in FIG. 5.

In step S316, the control unit 11 updates the final expiration date included in the parent page information to the final expiration date included in the child page information. That is, the control unit 11 makes an expiration date updating section 117 updates the expiration date included in the parent page information to the expiration date of the newly added record.

Then, the control unit 11 determines whether or not the parent page information, the final expiration date of which has been updated, is root page information (step S317). When the control unit 11 determines that the parent page information is not root page information (step S317: NO), the process proceeds to step S318. On the other hand, when the control unit 11 determines that the parent page information is root page information (step S317: YES), the control unit 11 ends the update of the content catalog information and the process proceeds to step S5 shown in FIG. 5.

In step S318, the control unit 11 newly sets the parent page information, the final expiration date of which has been updated, as child page information.

Then, the control unit 11 specifies the parent page information of the newly set child page information (step S319) and returns to step S315. In this way, update of the final expiration date is repeatedly performed toward the root page information until it is determined that the final expiration date included in the child page information is not later than the final expiration date included in the parent page information in step S315 or it is determined that the parent page information is root page information in step S317. Accordingly, when the leaf page information including a new record is added, the final expiration date included in the page information from the parent page information of the added leaf page information to the root page information can be updated efficiently.

On the other hand, in expiration date update processing 2 in step S4, the control unit 11 first creates new leaf page information including a new record with an expiration date and the index information matched therewith. In the creation of the leaf page information, a unique page ID is given to the leaf page information, and the expiration date of the new record is stored in the leaf page information as first and final expiration dates. Then, on the basis of the index information matched with the record included in the created leaf page information, the control unit 11 specifies the node page information with which the leaf page information is to be associated. Then, the control unit 11 stores the page ID, which has been given to the created leaf page information, in the specified node page information. Accordingly, the created leaf page information is associated with the node page information as parent page information. In this way, the control unit 11 adds the new leaf page information including the new record in the content catalog information (step S401).

Then, the control unit 11 sets the added leaf page information as child page information (step S402). In addition, since processing in steps S403 to S408 shown in FIG. 7 is the same as the processing in steps S305 to S310 shown in FIG. 6, a repeated explanation will be omitted.

Figures 7, 7A, 7B:
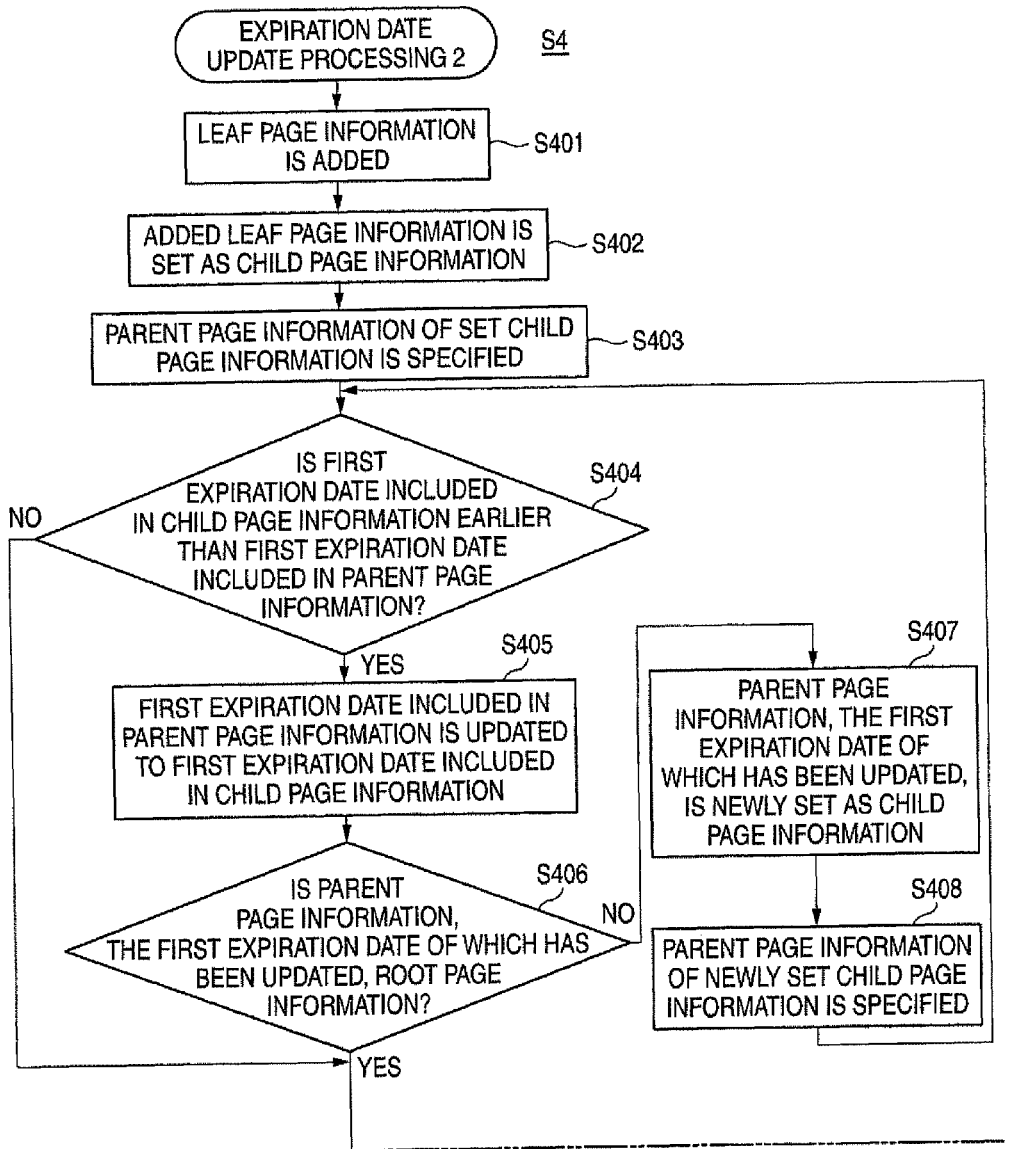
FIG. 7A and FIG. 7B are flow charts showing the details of expiration date update processing 2 in step S4 shown in FIG. 5.
Figure 7B:
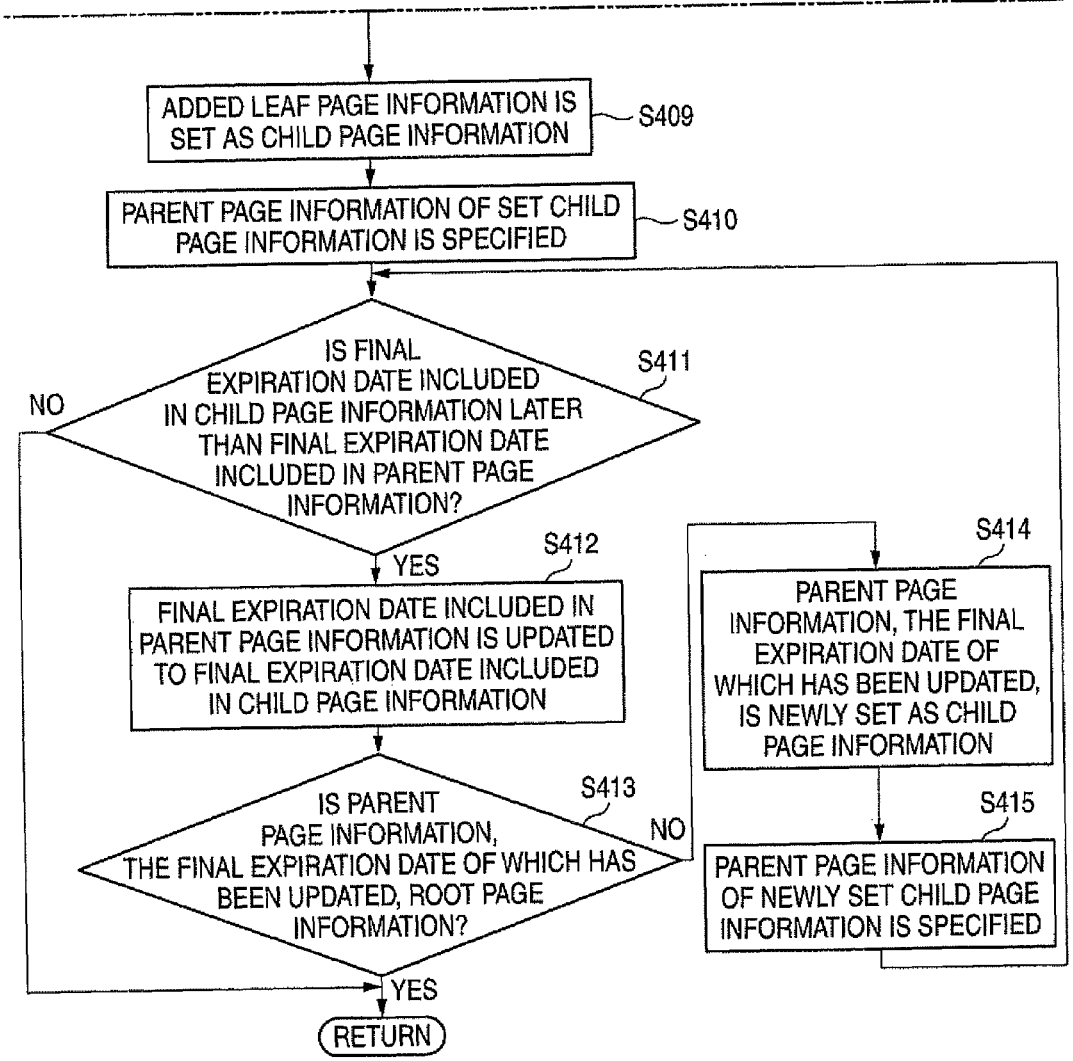

In step S409 shown in FIG. 7, the control unit 11 sets the added leaf page information as child page information. In addition, since processing in steps S410 to S415 shown in FIG. 7 is the same as the processing in steps S314 to S319 shown in FIG. 6, a repeated explanation will be omitted.

Then, in step S5 shown in FIG. 5, the control unit 11 distributes all or update difference of the updated content catalog information to the node Nn, in which the node information has been registered in the routing table using a DHT, by DHT multicast. In addition, the update difference herein means the page information created or updated by addition of a new record.

If the control unit 21 of the node Nn receives all or update difference of the updated content catalog information transmitted from the content managing server MS or another node Nn through the communication unit 29, the control unit 21 stores it in the storage unit 22.

(Operation when Searching for a Record of Expiration Date Expiry)

Next, an operation when searching for a record of expiration date expiry will be described with reference to FIGS. 2, 8, and 9A to 9C.

Figures 9, 9A, 9B, 9C:
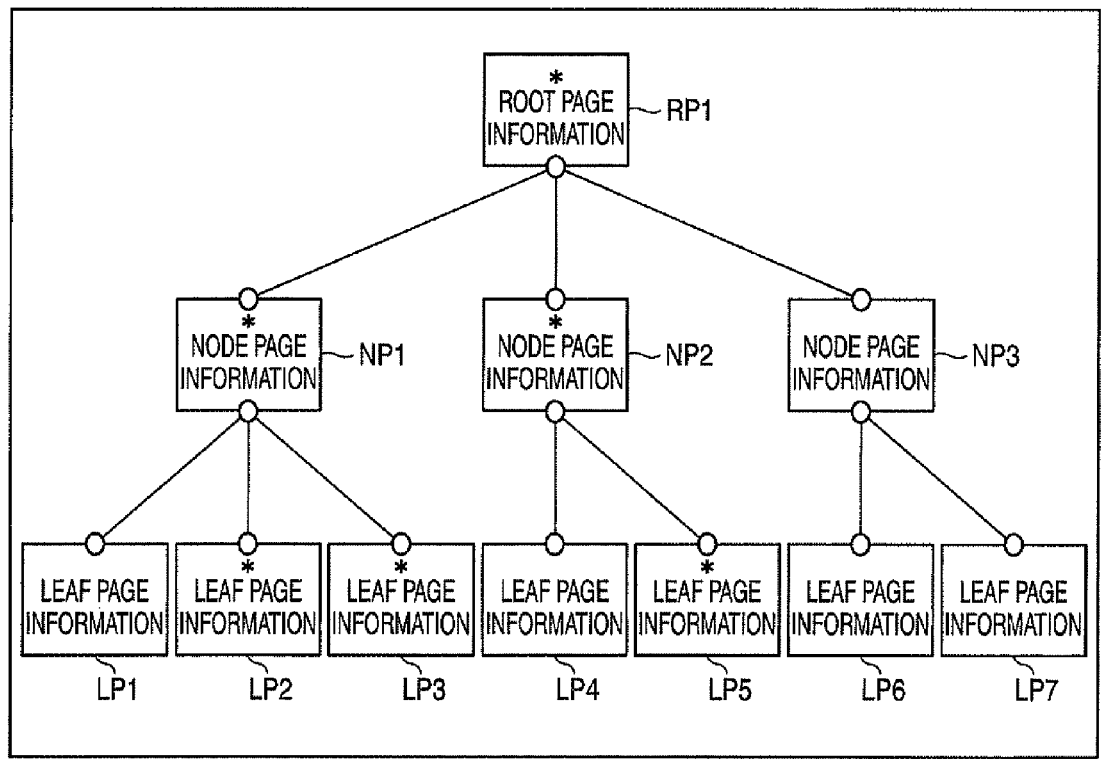
FIGS. 9A to 9C are image views showing the procedure of deleting a record that has passed its expiration date.
Figure 9B:
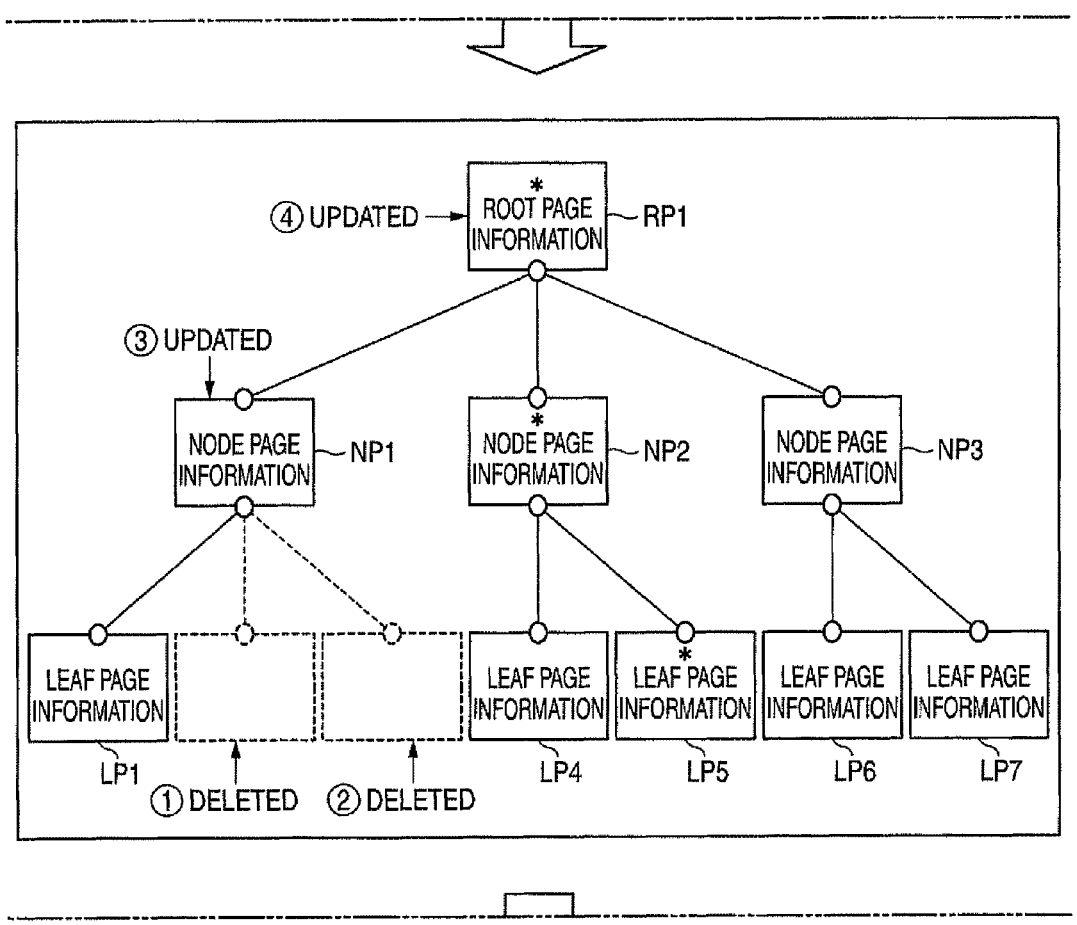
Figure 9C:
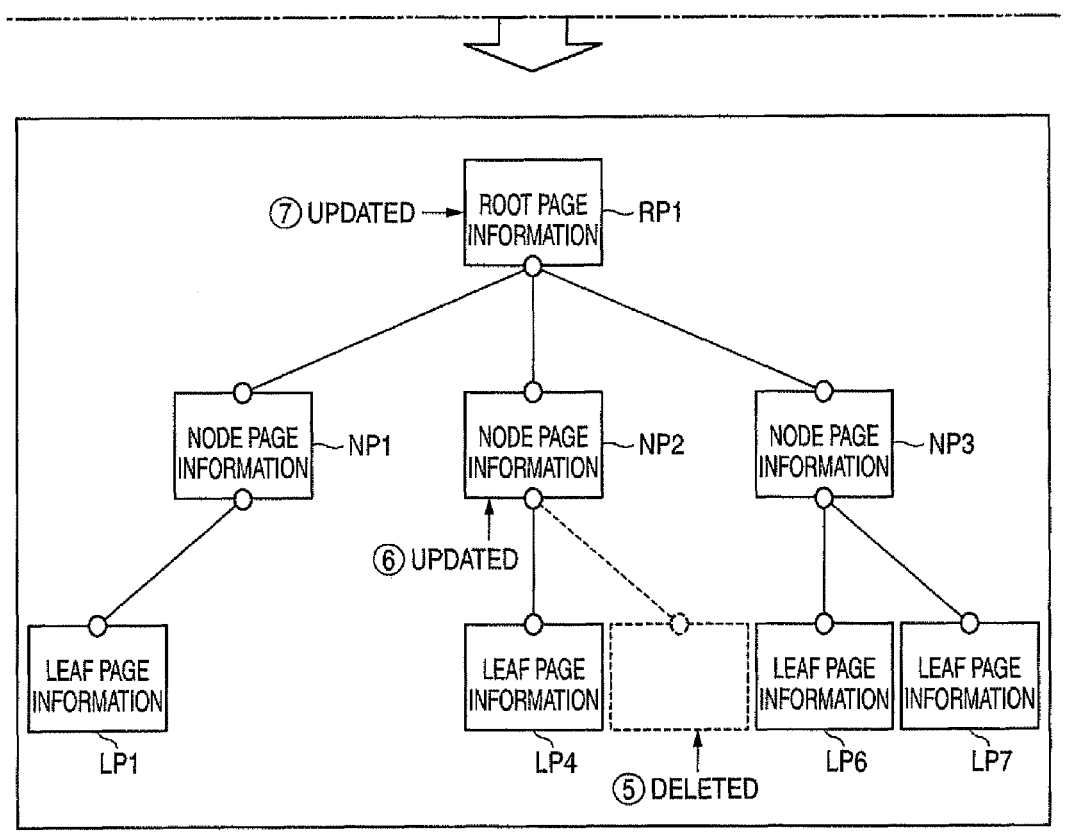

In addition, FIGS. 9A to 9C are simplified views of FIG. 2. Moreover, in FIG. 9, "*" is an expiration date expiry mark indicating that the first expiration date has come.

Figure 8B:
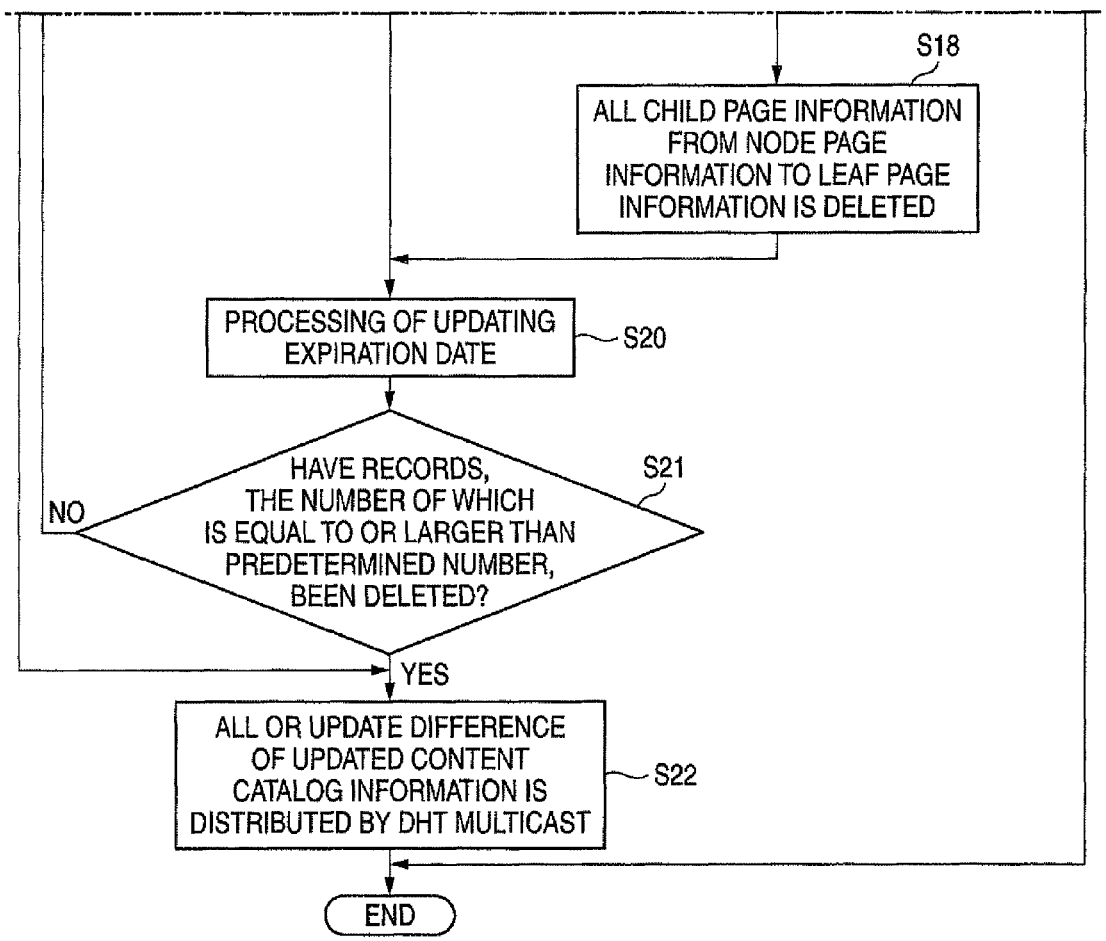

Processing shown in FIG. 8 is periodically performed at the deletion timing set beforehand, for example.

When the processing shown in FIG. 8 starts, the control unit 11 starts to search a record of expiration date expiry. When the control unit 11 searches the record of expiration date expiry, the control unit 11 determines whether or not the first expiration date included in the root page information has come by referring to current date (year, month, and day) and time (step S11). That is, when the control unit 11 searches the record of expiration date expiry, the control unit 11 determines the first expiration date included in the root page information. When the control unit 11 determines that the first expiration date included in the root page information has not come yet (step S11: NO), the processing of searching the record of expiration date expiry is ended. That is, when it is determined that the first expiration date included in the root page information has not come yet, the control unit 11 ends the processing of searching the record of expiration date expiry. On the other hand, when the control unit 11 determines that the first expiration date included in the root page information has come (step S11: YES), the control unit 11 specifies child page information of the root page information (step S12). For example, in the example shown in FIG. 9A, the node page information NP1 to NP3 is specified as the child page information of the root page information.

Then, the control unit 11 determines whether or not the first expiration date included in the specified child page information has come. That is, when the control unit 11 determines that the first expiration date included in the root page information has come, the control unit 11 determines that the expiration date included in the child page information of the root page information has come. Then, the control unit 11 extracts the child page information, the first expiration date of which has come, from the specified child page information (step S13). For example, it is assumed that current date (year, month, and day) and time is "2010/8/9 0:00". In this case, in the example shown in FIG. 2, it is determined that the first expiration date has come since the first expiration date included in the root page information RP1 is "2010/4/8 10:00". Accordingly, it is determined whether or not the first expiration date of each item of the node page information NP1 to NP10, which is the child page information of the root page information RP1, has come. As a result, for example, the node page information NP1 and NP10 determined that the first expiration date has come is extracted. Moreover, in the example shown in FIG. 9A, the node page information NP1 and NP2 is extracted as the child page information the first expiration date of which has come.

Then, the control unit 11 determines whether or not there is the extracted child page information which has not passed through the processing starting from step S15 (step S14). When the control unit 11 determines that there is no child page information which has not passed through the processing starting from step S15 (step S14: NO), the control unit 11 ends the update of the content catalog information and the process proceeds to step S22. On the other hand, when the control unit 11 determines that there is the child page information which has not passed through the processing starting from step S15 (step S14: YES), one child page information item is selected and the process proceeds to step S15.

In step S15, the control unit 11 determines whether or not the one selected child page information item is node page information or leaf page information. When the control unit 11 determines that the child page information is node page information (step S15: node page information), the process proceeds to step S16. On the other hand, when the control unit 11 determines that the child page information is leaf page information (step S15: leaf page information), the process proceeds to step S19.

In step S16, the control unit 11 determines whether or not the final expiration date included in the new page information, which is the one selected child page information item, has come. When the control unit 11 determines that the final expiration date included in the node page information has not come yet (step S16: NO), the process proceeds to step S17. On the other hand, when the control unit 11 determines that the final expiration date included in the node page information has come (step S16: YES), the process proceeds to step S18.

In step S17, the control unit 11 specifies child page information of the node page information. Then, the control unit 11 returns to step S13 to perform the same processing as described above on the specified child page information. That is, the control unit 11 determines the first expiration date included in the child page information of the node page information determined by the control unit 11 that the first expiration date has come in the previous processing of step S13.

In step S18, the control unit 11 deletes all of the page information from the one selected node page information item to the leaf page information. For example, it is assumed that current date (year, month, and day) and time is "2010/8/9 0:00". In this case, in the example shown in FIG. 2, it is determined that the final expiration date has come since the final expiration date included in the node page information NP1 is "2010/8/8 10:00". Accordingly, the node page information NP1 and the leaf page information LP1 to LP9 are deleted.

Then, the control unit 11 performs processing of updating the expiration date (step S20). In this update processing, first and final expiration dates included in the parent page information from the parent location of the deleted node page information to the root location are updated. In addition, the update of the first and final expiration dates progresses from the page information of low order hierarchy toward the page information of high order hierarchy as shown in the loop processing of steps S404 to S408 or the loop processing of steps S411 to S415 in FIG. 7. In the example shown in FIG. 2, the first expiration date included in the root page information RP1 is updated to the first expiration date, which comes first, among the first expiration dates included in the node page information NP2 to NP10 excluding the deleted node page information NP1. In addition, the final expiration date included in the root page information RP1 is updated to the final expiration date, which comes last, among the final expiration dates included in the node page information NP2 to NP10 excluding the deleted node page information NP1.

In step S19, the control unit 11 deletes a record which has reached its expiration date, among the records included in the leaf page information which is the one selected child page information item, and the index information matched with the record. For example, it is assumed that current date (year, month, and day) and time is "2010/5/9 0:00" and the expiration date of the record R1 included in the leaf page information LP1 is "2010/5/8 10:00". In this case, in the example shown in FIG. 2, the record R1 which has reached its expiration date and the index information matched therewith are deleted between the records R1 and R2. The record deleted in this way is found in order by depth-first search in a search tree. In addition, when expiration dates of all records included in the leaf page information which is the one selected child page information item have expired, the leaf page information is deleted. For example, it is assumed that current date (year, month, and day) and time is "2010/5/9 0:00". In this case, in the example shown in FIG. 2, the final expiration date included in the leaf page information LP1 is "2010/7/8 10:00". Accordingly, since the final expiration date has not come yet, the leaf page information LP1 is not deleted. On the other hand, the final expiration date included in the leaf page information LP2 is "2010/4/8 10:00". Accordingly, since the final expiration date has come, the leaf page information LP2 is deleted.

Then, the control unit 11 performs processing of updating the expiration date (step S20). In this update processing, first and final expiration dates included in the parent page information from the parent location of the leaf page information, in which the deleted record is included, or the deleted leaf page information to the root location are updated. For example, in the example shown in FIG. 9B, first and final expiration dates of the node page information NP1 and the root page information RP1 are updated by deletion of the leaf page information LP2 and LP3. In the example shown in FIG. 913, however, an expiration date expiry mark of the root page information RP1 is still shown because the leaf page information LP5 is not deleted at this point of time.

Then, the control unit 11 determines whether or not records the number of which is equal to or larger than a predetermined number have been deleted (step S21). When the control unit 11 determines that records the number of which is equal to or larger than a predetermined number have been deleted (step S21: YES), the control unit 11 ends the update of the content catalog information and the process proceeds to step S22. Thus, by specifying the number of records deleted so that records the number of which is equal to or larger than the specified number are not deleted, it is possible to prevent an increase in the load of the control unit 11 caused by deletion of a large number of records. A record left after deletion in the above processing is deleted at the next deletion timing. Although such record deletion processing is performed because the amount of data of the content catalog information increases if a record that has passed its expiration date is left, there is no problem even if all of the content catalog information are not updated at once since content that has passed its expiration date are processed so that it is possible to access the content on a program.

On the other hand, when records the number of which is equal to or larger than a predetermined number have not been deleted (step S21: NO), the process returns to step S14. Then, if the control unit 11 determines that there is the child page information extracted in step S13 which has not passed through the processing starting from step S15, the control unit 11 performs the processing starting from step S15 on the child page information. In the example shown in FIG. 9C, since records the number of which is equal to or larger than a predetermined number are not deleted, the leaf page information LP5 in a branch on the side of the node page information NP2 is also deleted. As a result, in the example shown in FIG. 9C, the expiration date expiry mark of the root page information RP1 has disappeared.

Then, in step S22, the control unit 11 distributes all or update difference of the updated content catalog information to the node Nn, in which the node information has been registered in the routing table using a DHT, by DHT multicast. In addition, the update difference herein means the page information updated by deletion of a record or deletion of leaf page information.

If the control unit 21 of the node Nn receives all or update difference of the updated content catalog information transmitted from the content managing server MS or another node Nn through the communication unit 29, the control unit 21 stores it in the storage unit 22.

In addition, the processing of searching for a record, which has passed its expiration date, shown in FIG. 8 may also be executed in each node Nn.

As described above, according to the embodiment, it is possible to efficiently determine whether or not there is a record which has reached its expiration date even if all records included in the content catalog information are not checked. In addition, it is possible to quickly search for a record which has reached its expiration date. That is, in the page information of high order hierarchy of a tree structure, expiration dates of records located in the low order hierarchy of the page information are intensively included. Accordingly, it is possible to determine whether or not there is a record, which has reached its expiration date, in certain page information to leaf page information in the tree structure. If there is a record which has not reached its expiration date, it is not necessary to check the page information starting from the branch location.

In addition, if it is determined that the final expiration date included in certain node page information in a tree structure has come, all page information from the page information to the leaf page information can be collectively deleted. As a result, useless searches can be prevented when searching for a record that has passed its expiration date.

(Second Embodiment)

In addition, the content catalog information in the present embodiment is also effective in normal record search executed in the node Nn. Hereinafter, an operation at the time of record search executed in the node Nn will be described with reference to FIG. 10.

Figure 10:
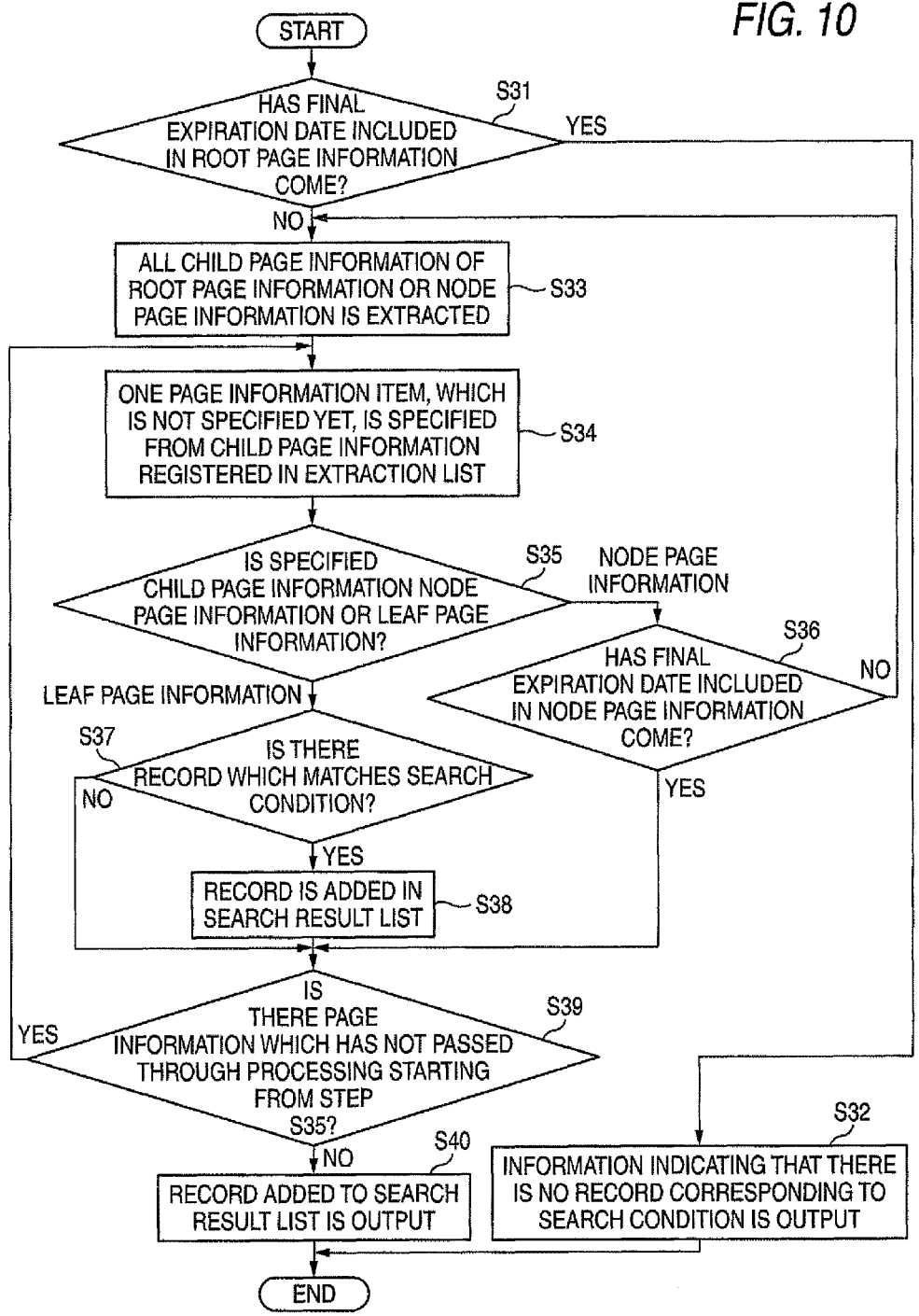
FIG. 10 is a flow chart showing an example of record search processing in a control unit 21 of the node Nn.

Processing shown in FIG. 10 starts when there is a user's search instruction through the input unit 30, for example. In this case, search conditions, such as a keyword, input through the input unit 30 from the user, are set. Alternatively, the search conditions are set beforehand in a program. As an example of the search conditions, a content name, a content ID, publication start date and time, and publication end date and time may be mentioned.

When record search starts by the search instruction, the control unit 21 determines whether or not the final expiration date included in the root page information has come by referring to current date (year, month, and day) and time (step S31). When the control unit 21 determines that the final expiration date included in the root page information has come (step S31: YES), the control unit 11 outputs the information, which indicates that there is no record corresponding to the search condition, from the display unit 26 or the speaker 28 (step S32). In this case, the information indicating that there is no record corresponding to the search condition is quickly notified to the user. In addition, the record search is ended. That is, since expiration dates of all records located in the low order hierarchy have expired if the final expiration date included in the root page information has come, it is not necessary to continue the record search thereafter.

On the other hand, when the control unit 21 determines that the final expiration date included in the root page information has not come (step S31: NO), the control unit 11 extracts all child page information of the root page information (step S33). The child page information extracted in this way is registered in an extraction list.

Then, the control unit 21 specifies one page information item, which is not specified yet, from the child page information registered in the extraction list (step S34).

Then, the control unit 21 determines whether the child page information specified from the extraction list is node page information or leaf page information (step S35). When the control unit 21 determines that the child page information is node page information (step S35: node page information), the process proceeds to step S36. On the other hand, when the control unit 21 determines that the child page information is leaf page information (step S35: leaf page information), the process proceeds to step S37.

In step S36, the control unit 21 determines whether or not the final expiration date included in the node page information specified from the extraction list has come. When the control unit 21 determines that the final expiration date included in the node page information has not come yet (step S36: NO), the process proceeds to step S33. In step S33, the control unit 21 specifies all child page information of the node page information specified from the extraction list. The child page information extracted in this way is additionally registered in the extraction list.

On the other hand, when the control unit 21 determines that the final expiration date included in the node page information has come (step S36: YES), the process proceeds to step S39.

In step S37, the control unit 21 determines whether or not there is a record, which matches the set search conditions, in records of the leaf page information specified from the extraction list. When the control unit 21 determines that there is a record which matches the search conditions (step S37: YES), the control unit 21 adds the record in a search result list (step S38) and the process proceeds to step S39. On the other hand, when the control unit 21 determines that there is no record which matches the search (step S37: NO), the process proceeds to step S39.

In step S39, the control unit 21 determines whether or not there is page information, which has not passed through the processing starting from step S35, in the page information registered in the extraction list. When the control unit 21 determines that there is page information which has not passed through the processing (step S39: YES), the process returns to step S34. Then, the control unit 21 specifies one page information item, which is not specified yet, from the extraction list, and performs the processing starting from step s35 in the same manner as described above.

On the other hand, when the control unit 21 determines that there is no page information which has not passed through the processing (step S39: NO), the control unit 21 outputs the record added to the search result list from the display unit 26 or the speaker 28 (step S40). In this case, a record which matches the search conditions is quickly notified to the user.

As described above, according to the second embodiment, from the final expiration date included in the root page information and the node page information, it is possible to check whether or not expiration dates of all records located in the low order hierarchy of the branch location of the page information have expired. Accordingly, it is possible to omit searching for a record of the branch location. As a result, useless searches can be prevented when searching for a record.

In addition, the record search processing shown in FIG. 10 may also be executed in the content managing server MS.

Moreover, in the above embodiment, the explanation has been performed on the assumption that the content distributed storage system S is formed by the algorithm using a DHT. However, the invention is not limited to this.

In addition, the invention is not limited to search of the content catalog information. The invention may also be applied as a record and an index of a general-purpose database.

In the first and second embodiments, the page information located at the root of a tree structure is used as the root page information of the invention. The root page information of the invention is not limited to the page information located at the root of the tree structure. In the present embodiment, either the node page information or the leaf page information stored as a tree structure may be determined as predetermined page information and set as the apex of a sub-tree. Setting of the page information which becomes the apex of a sub-tree may be arbitrarily selected by the user or may be automatically set on the basis of predetermined conditions by a program. In this case, the page information located at the apex of the sub-tree is set as the root page information of the invention. The above-described processing of searching the expiration date may be executed on the page information located at the apex of the sub-tree set as the root page information of the invention.

What is claimed is:

1. A managing apparatus comprising:
a storage unit that stores page information located at a root, a node, and a leaf in a tree structure, the storage unit storing the plurality of page information including an expiration date of a record that is included in any page information which is located at the root, at the node or at the leaf in the tree structure;
controller configured to:
search a record that has passed its expiration date;
determine whether or not the expiration date included in the page information has come when the controller searches the record that has passed its expiration date;
execute a first control process of determining whether or not the expiration date included in predetermined page information stored as the tree structure has come when the controller searches the record that has passed its expiration date; and
execute a second control process of completing the search of the record that has passed its expiration date when ,the controller determines in the first control process that the expiration date included in the predetermined page information has not come yet, and determining whether or not the expiration date included in page information located at a child of the predetermined page information has come when the controller determines in the first control process that the expiration date included in the predetermined page information has come.

2. The managing apparatus according to claim 1, wherein:

the controller determines the expiration date included in page information located at the root when the controller searches the record that has passed its expiration date and completes the search of the record that has passed its expiration date when the controller determines that the expiration date included in the page information located at the root has not come, the controller determines whether or not the expiration date included in page information located at the child of the page information located at the root has come when the controller determines that the expiration date included in the page information located at the root has come, when the controller determines that the expiration date included in the page information located at the child has come, the controller determines the expiration date included in the page information located at the child of the page information determined by the controller, and when the controller determines that the expiration date included in the page information located at the child has not come yet, the controller completes the search of records, the expiration dates of which have expired, from the location of the child of the page information determined by the controller to the location of the leaf.

3. The managing apparatus according to claim 1, wherein:

the storage unit stores, as the expiration date included in the page information, the expiration date which comes first among expiration dates of the plurality of records included in any page information from the page information to the page information located at the leaf, and the controller completes the search of records the expiration dates of which have expired when the controller determines that the expiration date included in the predetermined page information has not come yet.

4. The managing apparatus according to claim 3, wherein: the controller:

adds a new record including an expiration date into any of the plurality of page information;

determines whether or not the expiration date of the record newly added by the addition unit is earlier than the expiration date included in the page information to which the record has been added;

updates the expiration date included in the page information, to which the record has been added, to the expiration date of the added record when the controller determines that the expiration date of the added record is earlier than the expiration date included in the page information;

determines whether or not the expiration date of the newly added record is earlier than the expiration date included in page information, which is located at a parent of the page information determined by the controller, when the controller determines that the expiration date of the added record is earlier than the expiration date included in the page information; and updates the expiration date included in the page information, which is located at the parent, to the expiration date of the added record when the controller determines that the expiration date of the newly added record is earlier than the expiration date included in the page information located at the parent.

5. The managing apparatus according to claim 3, wherein: the controller:

adds new page information including a new record with an expiration date;

determines whether or not the expiration date of the new record is earlier than an expiration date included in page information located at a parent of the added new page information; and updates the expiration date included in the page information, which is located at the parent of the added new page information, to the expiration date of the new record when the controller determines that the expiration date of the new record is earlier than the expiration date included in the page information located at the parent.

6. The managing apparatus according to claim 1, wherein:

the storage unit stores, as the expiration date included in the page information, a final expiration date which comes last among expiration dates of the plurality of records included in any page information from the page information to the page information located at the leaf, the controller determines whether or not the final expiration date included in the page information has come, and the controller deletes all page information from the determined page information to the page information located at the leaf when the controller determines that the final expiration date has come.

7. The managing apparatus according to claim 6, wherein: the controller:

adds a new record with an expiration date in any of the plurality of page information;

determines whether or not the expiration date of the record newly added by the controller is later than a final expiration date included in the page information to which the record has been added;

updates the final expiration date included in the page information, to which the record has been added, to the expiration date of the added record when the controller determines that the expiration date of the added record is later than the final expiration date;

determines whether or not the expiration date of the newly added record is later than the final expiration date included in page information, which is located at a parent of the page information determined by the controller, when the controller determines that the expiration date of the added record is later than the final expiration date included in the page information; and updates the final expiration date included in the page information, which is located at the parent, to the expiration date of the added record when the controller determines that the expiration date of the newly added record is later than the final expiration date included in the page information located at the parent.

8. The managing apparatus according to claim 6, wherein: the controller:

adds new page information including a new record with an expiration date;

determines whether or not the expiration date of the new record is later than a final expiration date included in page information located at a parent of the added new page information; and updates the final expiration date included in the page information, which is located at the parent of the added new page information, to the expiration date of the new record when the controller determines that the expiration date of the new record is later than the final expiration date included in the page information located at the parent.

9. The managing apparatus according to claim 1, wherein the managing apparatus is a node apparatus in a content distributed storage system in which a plurality of content data is distributed and stored in a plurality of node apparatuses communicable with each other through a network.

10. A non-transitory computer-readable storage medium that stores a computer-executable program, the program comprising instructions for:

storing page information located at a root, a node, and a leaf in a tree structure and for storing the plurality of page information including an expiration date of a record that is included in any page information which is located at the root, at the node or at the leaf in the tree structure;

searching a record that has passed its expiration date;

determining whether or not the expiration date included in the page information has come when the record that has passed its expiration date is searched in a step of the searching;

executing a first control process of determining whether or not the expiration date included in predetermined page information stored as the tree structure has come when the record that has passed its expiration date is searched in the step of the searching; and executing a second control process of completing the search of the record that has passed its expiration date when it is determined, by a step of the first control process, that the expiration date included in the predetermined page information has not come yet, and determining whether or not the expiration date included in page information located at a child of the predetermined page information has come when it is determined, by the step of the first control process, that the expiration date included in the predetermined page information has come 11. The recording medium according to claim 10, wherein a managing program causing a computer of a node apparatus in a content distributed storage system, in which a plurality of content data is distributed and stored in a plurality of node apparatuses communicable with each other through a network, to execute the processing according to claim 10 is recorded.

12. An expiration date determining method comprising:

storing page information located at a root, a node, and a leaf in a tree structure and for storing the plurality of page information including an expiration date of a record included in any page information which is located at the root, at the node or at the leaf in the tree structure;

searching a record that has passed its expiration date;

determining whether or not the expiration date included in the page information has come when the record that has passed its expiration date is searched in a step of the searching;

executing a first control process of determining whether or not the expiration date included in predetermined page information stored as the tree structure has come when the record that has passed its expiration date is searched in the step of the searching; and executing a second control process of completing the search of the record that has passed its expiration date when it is determined, by a step of the first control process, that the expiration date included in the predetermined page information has not come yet and determining whether or not the expiration date included in page information located at a child of the predetermined page information has come when it is determined, by the step of the first control process, that the expiration date included in the predetermined page information has come.

* * * * *